United States Patent Office 3,568,303
Patented Mar. 9, 1971

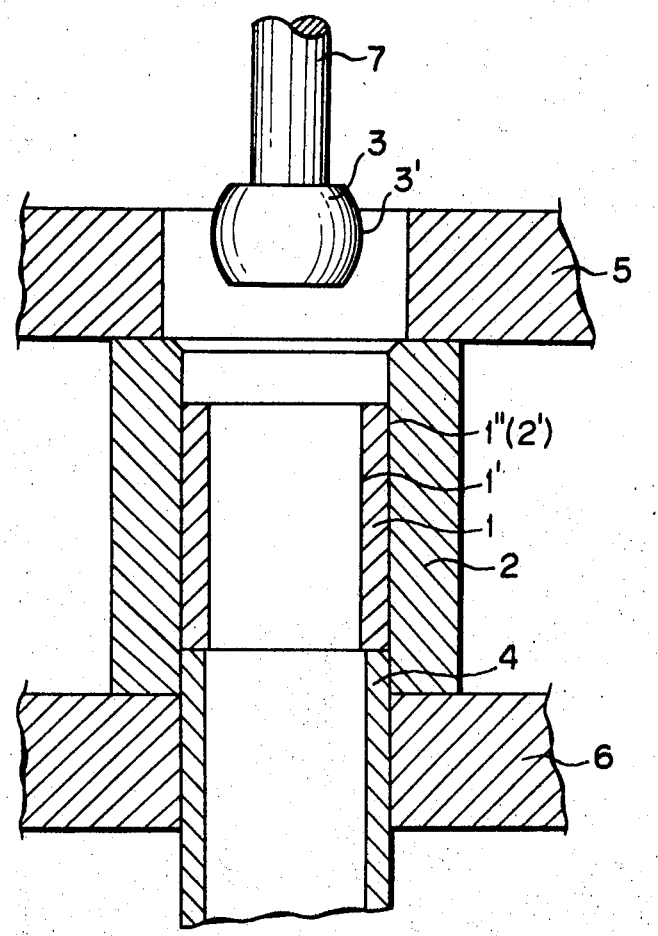

3,568,303
METHOD FOR WORKING A YOKE OF A SMALL-SIZED ELECTRIC MACHINE
Akio Ito, 93 Tsukasa-machi 2-chome, and Kazuhide Naruki, 45 Takara-machi 4-chome, both of Kariya-shi, Aichi-ken, Japan
Filed May 2, 1967, Ser. No. 635,573
Int. Cl. B23k 31/02
U.S. Cl. 29—480                                1 Claim

ABSTRACT OF THE DISCLOSURE

A method of forming a yoke for a small-sized electric machine in a plastic working operation to obtain its final inside and outside diameter dimensions comprised of the steps of forming a tubular wall section having an inside diameter and outside diameter less than the final inside diameter and outside diameter dimensions of the yoke, placing the tubular wall section within a laterally confined space having an inside diameter substantially equal to the final outside diameter of the yoke, exerting a transverse linear force uniformly about the interior of the tubular wall section for plastically deforming it outwardly whereby its inside diameter conforms with the final inside diameter of the yoke and its outside diameter conforms to the final outside diameter of the yoke.

Apparatus for forming a yoke of a small-sized electric machine comprised of a tubular die member having an inside diameter substantially equal to the final diameter of the yoke and a head member having at least a partly spherical surface. The spherical surface of the head member has a diameter substantially equal to the final inside diameter of the yoke and a rod member is associated with the head member. Accordingly, when a tubular wall section having an inside and an outside diameter smaller than the final inside and outside diameters of the yoke is inserted into the tubular die member and the head member is inserted within the tubular wall section and a radially outwardly directed linear force is exerted uniformly about the transverse interior surface of the tubular wall section; it is plasticly deformed and provided with its final inside and outside diameter dimensions.

SUMMARY OF THE INVENTION

The present invention relates to an improved method for the finish working of a yoke of a small-sized DC machine, as for instance, in an automobile.

In the conventional method of this kind, a yoke of such an electric machine is subjected to the finishing of its inside and outside diameters, the finishing being performed in a cutting process in which a lathe, broaching machine, etc. is used. In this case, the margin to be cut is relatively large and therefore the cost of raw material becomes higher, while the rate of loss during the cutting process is remarkable.

An object of the present invention is to overcome the difficulties to which reference has been made.

Another object of the present invention is to provide a method that takes the place of the conventional method using cutting, in which a yoke of a small-sized electric machine is finished so that its inside and outside diameter may finally be determined, under the limitation in the free radial motion of the yoke material, by forcing a spherical body of steel into a cylindrical hole in the yoke material which is positioned within a die.

For an understanding of the principles of the present invention, reference is made to the following description of a typical embodiment thereof illustrated in the accompanying drawing.

Referring to the drawing, in which a section of a working apparatus embodying the method of the present invention is shown, a yoke material 1 is formed in the shape of a cylinder. This may be performed in an appropriate manner. The yoke material is then inserted into a die 2 provided between die holders 5, 6. In order to force a partly spherical body of steel 3 into a cylindrical hole, which has an inside diameter 1', in the yoke material, a rod 7 fixed to the spherical body 3 is pressed downward into the upper end of the hole in the yoke material. The rod 7 and the spherical body 3 are not combined in a single body. As the result of the insertion force stated above, the inside diameter 1' of the yoke material is increased to be equal to the outside diameter 3' of the spherical steel body 3, while the outside diameter 1" of the yoke material is changed to be equal to the inside diameter 2' of the die 2. Accordingly, the inside and outside diameter of the yoke material can be finished on the basis of the outside diameter of the spherical body of steel 3 and of the inside diameter of the die 2, to the predetermined required values.

The yoke thus finished may be taken out by means of a pushing tool 4 at the lower end.

As described above, in accordance with the present invention, an iron plate or plates having a weight equal to that of the yoke is cylindrically bent and the seam produced is joined by welding. If the yoke material is extended in the axial direction by plastic working, then, favorably, a required length of any yoke is obtained without the loss of material. Furthermore, the yoke material is inserted into a die the inside diameter of which is determined so that the outside diameter of the yoke material may be finished to a desired value, and the yoke material is, under the limitation of free radial motion over its full length, subjected to the forced pushing of a spherical body of steel which may or may not be combined in a single body with its pushing rod, and which has an outside diameter that is determined so that the inside diameter of the yoke material may be finished to a desired value. Thereby, the inside and outside diameter of the yoke material are simultaneously finished by plastic working to have the desired values respectively, while the yoke material is extended in the axial direction by the forced pushing. Accordingly, the friction between the spherical body of steel and the yoke material is less, as compared with the conventional case in which a column-shaped body is used for the forced pushing. The pressing force is less, too. There is no possibility of spreading the inside diameter of the yoke material beyond the predetermined dimension because even if the spherical body of steel is slanted its diameter remains the same.

Furthermore, as compared with the conventional working method in which a yoke material is pressed at its upper and lower ends and in which an upper and a lower punch as guides of a column-shaped body are provided so that the radial motion of the body may heavily be restricted, the radial motion of the spherical body of steel not combined in a single body with the pushing rod is not heavily restricted in the case of the present invention. In addition, the spherical body of steel does not have an axially elongated contact surface and is not restricted, in its radial motion, by the yoke material. Accordingly, the spherical body of steel can pass through the hole of the yoke material along a center line thereof by making use of the radial reaction force produced by the yoke material. Thereby, a uniform thickness of a wall of the yoke is obtained. This is one of the most favorable effects of the present invention.

Furthermore, because iron plates are used for the method of the present invention, it is also possible to obtain a far higher flux-density, as compared with the case in which a sintered body is used for the working.

It is to be noted that various modifications of the disclosed embodiment of the present invention may be made without departing from the spirit and scope thereof as set forth in the appended claim.

What is claimed is:

1. A method of forming a yoke for a small-sized electric machine in a plastic working operation to obtain its final inside and outside diameter dimensions comprising the steps of forming an iron plate wall section, having a weight equal to that of the yoke to be formed, into an axially elongated cylindrically shaped tubular section with the opposite edges of the plate joined together and having diametrical dimensions less than the final diametrical dimensions of the yoke; poistioning the full length of the tubular shaped wall section within a laterally confined space having an inside diameter substantially equal to the final predetermined outside diameter of the yoke to be formed; inserting an at least partly spherically shaped body, with the spherically shaped surface thereof having a diameter equal to the final inside diameter of the yoke to be formed, into one end of the tubular section so that the spherically shaped surface contacts the interior surface of the tubular section, arranging the spherically shaped body so that it can pivot within the tubular section with its center located for movement along the axial center of the yoke to be formed; displacing the spherically shaped body through the tubular section from one end to the other so that the body exerts a radially outwardly directed circular linear force against the interior surface of the tubular section in reaction to the radial force produced by the tubular section with the center of the circular linear force located on the axial center of the yoke to be formed; and removing the expanded tubular section from the laterally confined space; whereby the removed tubular section is plastically deformed so that both its inside diameter and outside diameter are the same as the predetermined inside and outside diameters of the yoke.

References Cited

UNITED STATES PATENTS

| 1,647,447 | 11/1927 | Hartnett | 72—370 |
| 2,025,922 | 12/1935 | Weinrich | 29—493X |

FOREIGN PATENTS

| 215,380 | 5/1958 | Australia | 72—370 |
| 627,294 | 9/1927 | France | 72—370 |
| 17,085 | 8/1898 | Great Britain | 72—370 |

JOHN F. CAMPBELL, Primary Examiner

R. J. SHORE, Assistant Examiner

U.S. Cl. X.R.

72—370